(12) United States Patent
Leeds

(10) Patent No.: US 6,279,328 B1
(45) Date of Patent: Aug. 28, 2001

(54) COOLING METHOD AND SYSTEM FOR A ROTATING DRUM

(75) Inventor: Richard Leeds, Saint Louis, MO (US)

(73) Assignee: Air Liquide America Corporation Intellectual Property Department, Houston, TX (US)

(*) Notice: Subject to any disclaimer, the term of this patent is extended or adjusted under 35 U.S.C. 154(b) by 0 days.

(21) Appl. No.: 09/541,225

(22) Filed: Apr. 3, 2000

(51) Int. Cl.[7] ................................................ F25D 17/02
(52) U.S. Cl. ................................ 62/64; 62/346; 62/374
(58) Field of Search .............................. 62/64, 68, 346, 62/373, 374, 381

(56) References Cited

U.S. PATENT DOCUMENTS

| | | | |
|---|---|---|---|
| 3,152,453 | * 10/1964 | Hamilton | 62/346 |
| 3,214,928 | * 11/1965 | Oberdorfer | 62/64 |
| 4,137,723 | * 2/1979 | Tyree, Jr. | 62/373 |
| 4,700,546 | * 10/1987 | Mattson | 62/64 |
| 5,036,673 | * 8/1991 | Miller et al. | 62/346 |
| 5,104,232 | * 4/1992 | Lennox, III | 62/68 |
| 5,199,269 | * 4/1993 | Anderson | 62/346 |
| 5,456,091 | * 10/1995 | Zittel | 62/381 |
| 6,079,215 | * 6/2000 | Wisniewski | 62/64 |

OTHER PUBLICATIONS

Challenge RMF Products Brochure, 1997, Challenge–RMF, Inc.
Challenge RMF Product Brochure, 1995, Challenge–RMF, Inc.

\* cited by examiner

*Primary Examiner*—William E. Tapolcai
(74) *Attorney, Agent, or Firm*—Burns, Doane, Swecker & Mathis, LLP

(57) ABSTRACT

A method and system for controlling a temperature of products in a rotating drum employs nozzles to deliver a heat transfer fluid in a more efficient manner. The heat transfer fluid nozzles which are positioned around the interior of the rotating drum deliver the heat transfer fluid to the product in the drum when the nozzles are positioned under the product and prevent delivery of the heat transfer fluid when the nozzles are not under the product. This improves the efficiency of the heat transfer system substantially over known systems in which the heat transfer fluid is delivered continuously and a large portion of the heat transfer fluid is exhausted from the rotating drum before contacting the product. The heat transfer system also provides a self cleaning system for the nozzles which deliver the heat transfer fluid to the drum.

15 Claims, 2 Drawing Sheets

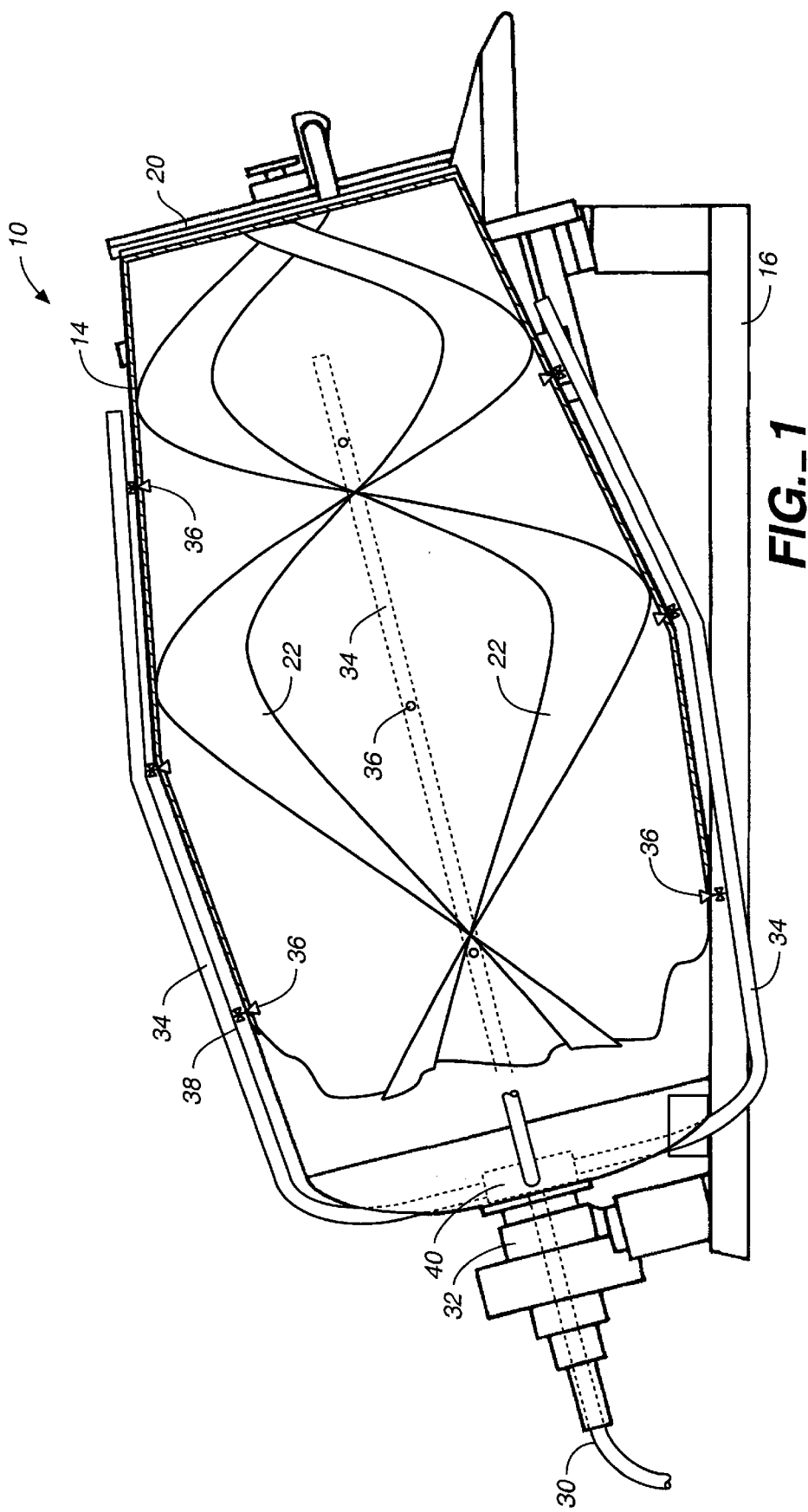
FIG._1

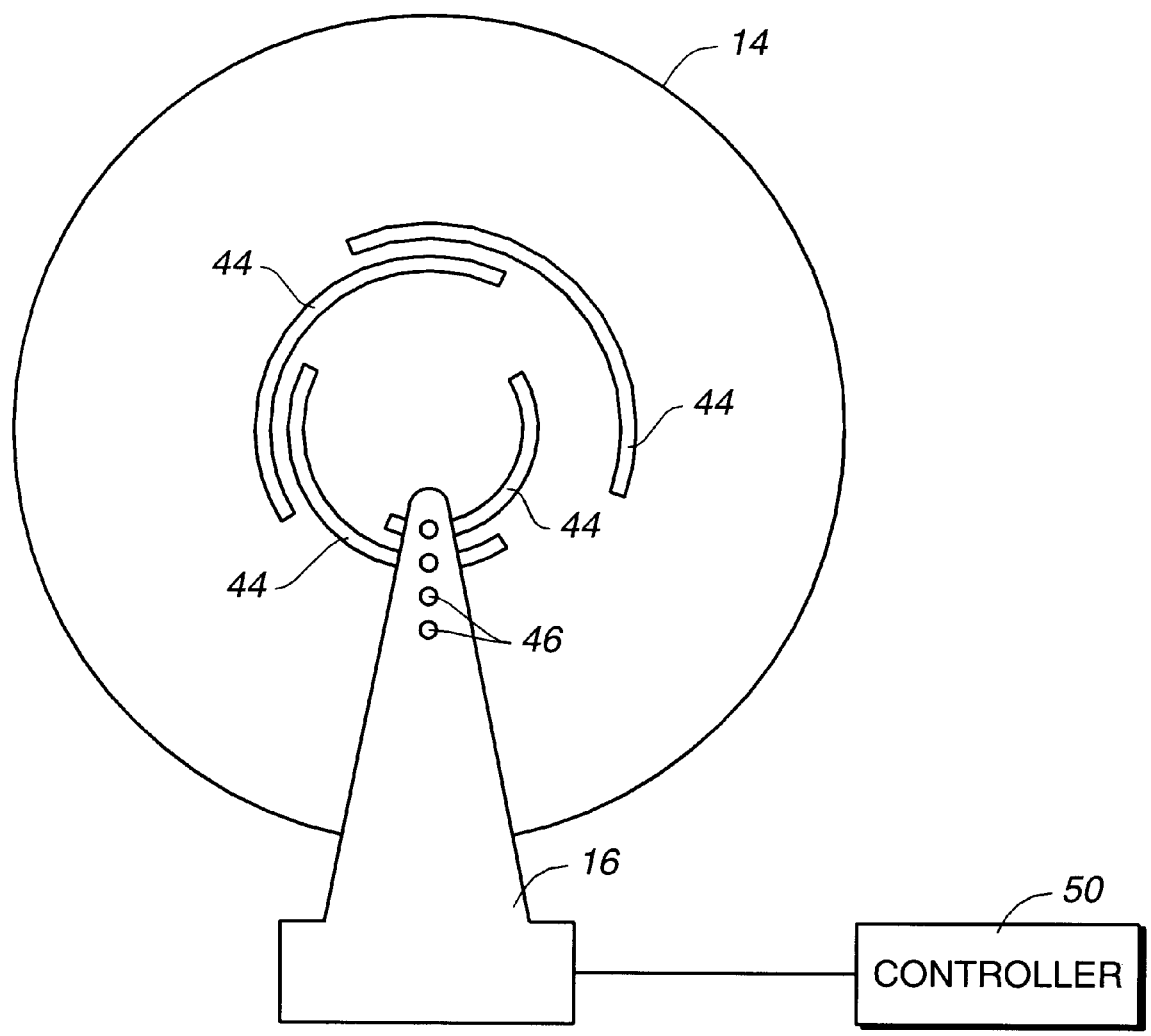
FIG._2

COOLING METHOD AND SYSTEM FOR A ROTATING DRUM

BACKGROUND OF THE INVENTION

1. Field of the Invention

The invention relates to a temperature controlling method and system for a rotating drum, and more particularly, the invention relates to a method and system for chilling products in a tumbler type processing drum which includes a plurality of nozzles for controlled delivery of a cooling agent.

2. Brief Description of the Related Art

The food processing industry commonly uses rotating drum processing devices which tumble and cool food products such as meat, poultry, and fish. These rotating drums may be used for marinating, massaging, cooling, mixing, or other processes. The food products which are generally processed in a rotating drum processor include whole hams, steaks, ribs, chicken parts, whole birds, fish, shrimp, vegetables, and the like.

The cooling system of a direct injection massager or marinater device involves the delivery of a cooling fluid, such as carbon dioxide or nitrogen, into the drum through a lance with openings formed in it. The lance is attached to and supported on a hatch on the rear of the drum. However, the delivery of the cooling fluid in this manner suffers from substantial inefficiencies because a large portion of the cooling fluid goes from the lance to an exhaust without ever coming into contact with the product in the drum. These systems also fail to provide uniform cooling of the product.

Accordingly, it would be desirable to deliver the cooling fluid directly to the product and to prevent cooling fluid from going out the exhaust without contacting the product.

In addition, the product tends to build up on the lance, partially or fully closing the cooling fluid delivery openings and reducing the ability to deliver cooling fluid.

Thus, it would be desirable to provide a system which prevents product buildup over the cooling fluid delivery openings.

SUMMARY OF THE INVENTION

The present invention relates to a temperature controlling method and system for a rotating drum type product processing device.

In accordance with one aspect of the present invention, a temperature control system for a rotating drum including a rotating drum, a plurality of heat transfer fluid delivery nozzles space around and connected to the rotating drum for controlling a temperature of a product in the rotating drum, a plurality of valves associated with the plurality of nozzles, and a control system for controlling the plurality of valves to deliver the heat transfer fluid to a product in the drum when the nozzles are positioned substantially under the product and to prevent delivery of the heat transfer fluid when the nozzles are not substantially under the product.

In accordance with an additional aspect of the present invention, a method of controlling a temperature of a product in a rotating drum includes the steps of: placing a product in a rotating drum having a plurality of heat transfer fluid delivery nozzles spaced around and connected to the rotating drum; rotating the drum; and delivering a heat transfer fluid to the product in the drum when the nozzles are positioned substantially under the product and preventing delivery of the heat transfer fluid when the nozzles are not substantially under the product.

The present invention provides advantages of increased efficiency and uniformity of cooling and reduced clogging of the heat transfer fluid delivery openings.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 1 is a partially cut away side view of a rotating drum type product processing device according to the present invention; and FIG. 2 is a schematic end view of a sensing system for the rotating drum according to the present invention.

DETAILED DESCRIPTION OF THE PREFERRED EMBODIMENTS

FIG. 1 illustrates a rotating drum type processing device 10. The processing device 10 includes a rotatable drum 14 mounted in a rotatable manner on a support 16 in a manner which is known. One or more ends of the drum 14 is provided with a hatch 20 for inserting and removing product from the drum. The interior of the drum 14 is provided with one or more helical mixing elements 22 which function to mix and massage the product as the drum is rotated.

The rotating drum product processing device shown in FIG. 1 is particularly useful for marinating and cooling meat items to gently achieve infusion of marinade into the meat, poultry, seafood, or other food products without damage. However, the drum may also be used for many other processes including tenderizing, cooling, heating, or maintaining a desired temperature.

The processing device 10 of FIG. 1 also includes a cooling fluid delivery pipe 30 for delivery of a cooling fluid or other fluid to the product. The cooling delivery pipe 30 is connected by a rotary coupling 32 to a cooling fluid distribution system for the drum 14. The rotary coupling 32 may be a vacuum insulated rotary coupling or the like. The cooling fluid distribution system includes a plurality of veins 34 extending longitudinally along the drum 14 and a plurality of nozzles 36 for delivering the cooling fluid from the veins into the interior of the drum.

The present invention includes a control system which controls delivery of the cooling fluid through the nozzles 36 so that the cooling fluid is injected when the nozzles are positioned under the product in the drum 14 and not when the nozzles are located in open air. By firing the nozzles 36 only when they are under the product, the cooling fluid is utilized more efficiently and is more uniformly distributed through the product. This system allows a higher utilization of the available BTUs in the cooling fluid than was previously attainable. In addition, the system provides for a more uniform injection of the cooling fluid, reduces cold pockets, and creates a more isothermal product.

The present invention is expected to provide a 15% to 65% increase in efficiency over conventional systems. In some particularly inefficient systems the efficiency may increase may be 100% or better. The increased efficiency is provided by both the cost savings due to reduced cryogen consumption and the time savings due to faster throughput.

The system for cooling according to the present invention provides a quicker cooling time because more cryogen can be injected faster without fear of losing all the BTUs to the exhaust. Increased throughput means that users can meet their processing requirements with fewer massagers or batches.

FIG. 1 illustrates a plurality of veins 34 and a system of valves 40 for controlling the cooling fluid which is directed from the rotatable coupling 32 to the veins 34. The valves 40 are controlled by a control system.

One example of a control system is illustrated in FIG. 2 which is a schematic illustration of one end of the drum 14 having a plurality of sensing strips 44 and a plurality of sensors 46. The sensing strips 44 are positioned on the rotating drum while the sensors 46 are maintained stationary and sense a rotational position of the rotating drum. However, the positions of the sensors and strips may be modified. The sensors 46 are connected to a controller 50 which controls the valves 40 to deliver the cooling fluid to the nozzles 36. Alternatively, the valves 40 may be directly controlled by the sensors 46 or may be controlled by an overall control system for the drum processor.

According to one embodiment of the invention, the sensing strips 44 are arced strips. One sensing strip 44 is provided for each vein 34 of nozzles 36 in the drum. Each of the sensors 46 tells the corresponding valve 40 when to open and close based on the absence or presence of the sensing strip 44. The portion of one rotation during which the nozzles are turned on will vary depending on the application and the amount of product in the drum 14. However, the nozzles are preferably turned on when they are substantially under the product which is generally about 45° to about 90° of the rotation of the drum.

According to one preferred embodiment of the invention, check valves 38 are positioned just upstream of each of the nozzles 36. The use of the check valves 38 insures that the nozzles 36 will not become plugged from product which has frozen over the nozzle orifices by causing the orifices to be periodically blown clean. In particular, the check valves 38 allow the cooling fluid to flow only in one direction and preclude the fluid from flowing back in the system. This traps the cooling fluid in an area of pipe between the check valve and the nozzle when the cooling fluid is not flowing through a nozzle. The trapped fluid quickly warms, expands, and blows the nozzle orifice clean. For example, when liquid nitrogen is used as a cooling fluid the liquid nitrogen is delivered at −320° F. When the nitrogen is trapped between the nozzle and the check valve, it is exposed to ambient air at temperatures of about 40 to 70° F. The nitrogen expands rapidly to approximately 700 times its volume and hence blows the orifice clean. This provides a significant advantage over the prior art cooling systems in which the orifices tend to become clogged with product preventing adequate cooling.

The use of the check valves 38 also allows the cryogen to be delivered to the drum 14 at a lower pressure which increases the available BTUs for cooling and therefore increases the efficiency and lowers the operating cost and operating time of the system.

The cooling fluid which is used in the present invention is preferably a liquid cryogen such as carbon dioxide, nitrogen, liquid air, or mixtures thereof. However, other heat transfer fluids may also be used.

The nozzle arrangement which is shown in FIG. 1 is merely one of the nozzle arrangements which may be used. The number, locations, and arrangement of the nozzles may be varied depending on the cooling requirements of a particular application.

Although the present invention has been described as a cooling system for a food processing device, it should be understood that the cooling system may also be used for processing devices used for cooling non-food products. For example, the invention may be use in the chemical industry.

While the invention has been described in detail with reference to the preferred embodiments thereof, it will be apparent to one skilled in the art that various changes and modifications can be made and equivalents employed, without departing from the present invention.

What is claimed is:

1. A temperature control system for a rotating drum, the system comprising:

a rotating drum;

a plurality of heat transfer fluid delivery nozzles space around and connected to the rotating drum for controlling a temperature of a product in the rotating drum;

a plurality of valves associated with the plurality of nozzles; and a control system for controlling the plurality of valves to deliver the heat transfer fluid to a product in the drum when the nozzles are positioned substantially under the product and to prevent delivery of the heat transfer fluid when the nozzles are not substantially under the product.

2. The system of claim 1, wherein the heat transfer fluid is a cooling fluid and the product is cooled.

3. The system of claim 1, wherein the control system includes at least one sensor for sensing a rotational position of the rotating drum.

4. The system of claim 3, wherein the nozzles are arranged in a plurality of veins and a sensor is provided for sensing a rotational position of each of the veins.

5. The system of claim 4, wherein each of the sensors detects the presence of an adjustable arced strip.

6. The system of claim 1, wherein the rotating drum is a food massager and marinater.

7. The system of claim 1, further comprising a heat transfer fluid delivery pipe and a rotatable fluid coupling for delivering the heat transfer fluid to the plurality of valves.

8. The system of claim 1, wherein the drum is provided with a plurality of internal helical mixing elements.

9. The system of claim 1, further comprising a check valve positioned directly upstream of each of the fluid delivery nozzles for trapping the heat transfer fluid between the check valve and the nozzle orifice and allowing the orifice to be blown clean.

10. A method of controlling a temperature of a product in a rotating drum, the method comprising;

placing a product in a rotating drum having a plurality of heat transfer fluid delivery nozzles spaced around and connected to the rotating drum;

rotating the drum; and delivering a heat transfer fluid to the product in the drum when the nozzles are positioned substantially under the product and preventing delivery of the heat transfer fluid when the nozzles are not substantially under the product.

11. The method of claim 10, further comprising a step of sensing a rotational position of the rotating drum.

12. The method of claim 10, further comprising a step of mixing the product in the drum with a plurality of helical mixing elements.

13. The method of claim 10, further comprising a step of blowing the nozzles clean by expansion of heat transfer fluid when the heat transfer fluid is not being delivered to the drum.

14. The method of claim 10, wherein the heat transfer fluid is a cooling fluid and the product is cooled.

15. The method of claim 14, wherein the heat transfer fluid is a cryogen.

* * * * *